United States Patent [19]

Fontana

[11] Patent Number: 4,912,198

[45] Date of Patent: Mar. 27, 1990

[54] MELT STABILIZING CYCLIC CARBONATE WITH ORGANIC PHOSPHITE

[75] Inventor: Luca P. Fontana, Evansville, Ind.

[73] Assignee: General Electric Company, Schenectady, N.Y.

[21] Appl. No.: 304,151

[22] Filed: Jan. 31, 1989

[51] Int. Cl.[4] ............................................. C08G 63/62
[52] U.S. Cl. ..................... 528/370; 524/117; 524/118; 524/119; 524/120; 524/128; 528/371; 528/373; 528/377; 528/391
[58] Field of Search ............... 528/370, 371, 373, 377, 528/391; 524/117, 118, 119, 120, 128

[56] References Cited

U.S. PATENT DOCUMENTS

| | | | |
|---|---|---|---|
| 3,155,683 | 11/1964 | Moody | 549/228 |
| 3,274,214 | 9/1966 | Prochaska | 549/228 |
| 3,305,520 | 2/1967 | Fritz et al. | 524/151 |
| 3,386,954 | 6/1968 | Schnell et al. | 528/371 |
| 3,422,119 | 1/1969 | Prochaska | 549/228 |
| 3,498,946 | 3/1970 | Calkins | 524/109 |
| 3,525,706 | 8/1970 | Calkins | 524/153 |
| 3,622,538 | 11/1971 | Green | 524/151 |
| 3,673,146 | 6/1972 | Factor | 524/109 |
| 3,733,296 | 5/1973 | Cleveland et al. | 524/120 |
| 3,763,063 | 10/1973 | Factor | 524/147 |
| 3,769,367 | 10/1973 | Factor | 524/147 |
| 3,945,967 | 3/1976 | Jaquiss | 524/108 |
| 4,066,611 | 1/1978 | Axelrod | 524/114 |
| 4,076,686 | 2/1978 | Calkins | 524/109 |
| 4,118,352 | 10/1978 | Haberlein et al. | 524/114 |
| 4,125,501 | 11/1978 | Haberlein et al. | 524/117 |
| 4,129,553 | 12/1978 | Haberlein et al. | 524/114 |
| 4,138,379 | 2/1979 | Scott et al. | 524/114 |
| 4,197,384 | 4/1980 | Bialous et al. | 524/114 |
| 4,221,728 | 9/1980 | Jaquiss et al. | 524/135 |
| 4,233,208 | 11/1980 | Spivack | 524/149 |

*Primary Examiner*—Harold D. Anderson
*Attorney, Agent, or Firm*—Mary A. Montebello; James C. Davis Jr.; William H. Pittman

[57] ABSTRACT

Cyclic carbonate oligomers are stabilized according to the present invention by admixing a composition containing cyclic carbonate oligomers with an amount of an organic phosphite sufficient to substantially prevent premature polymerization of the oligomers.

18 Claims, No Drawings

MELT STABILIZING CYCLIC CARBONATE WITH ORGANIC PHOSPHITE

This invention relates to a method for increasing the melt stability of certain oligomers. More particularly, this invention relates to a method for increasing the melt stability of cyclic carbonate oligomers.

The use of organic phosphites to stabilize polycarbonate compositions is known in the art. Reference is made, for example, to U.S. Pat. Nos. 3,305,520, 3,945,967, 4,076,686, 4,221,728 and 4,335,039. In the prior art, organic phosphites have been used to stabilize polycarbonate compositions against degradation, i.e., the conversion of an organic compound to one containing a smaller number of carbon atoms.

Cyclic carbonate oligomers are useful in the preparation of polycarbonates. The conversion of cyclic carbonate oligomers to linear polycarbonates has high potential for use in reactive processing methods, such as pultrusion, rotational molding and polymerization in a mold for direct production of molded articles, and in composite formation. One reason for this is the low melt viscosity of the oligomer mixtures, which makes handling the mixtures and wetting filler materials simple, convenient and efficient.

However, a problem associated with polycarbonate preparation from cyclic oligomers is the chemical instability of these oligomers in the melt phase, i.e., in a molten state prior to conversion to higher molecular weight linear polycarbonates. The oligomers often undergo spontaneous polymerization at elevated temperatures, above about 250° C., even in the absence of a polymerization initiator. It is thought that impurities present in the cyclics or introduced from the environment act as substitute initiators which induce ring opening and polymerization.

The premature polymerization of the cyclic oligomers results in an undesirable increase in viscosity prior to use of the mixture. High initial viscosities prevent the rapid flow of the cyclic oligomer mixture into mold cavities, thereby preventing completion of the mold processing operations. It is therefore important to prevent any increase in viscosity since polymerization of the cyclic oligomers to high molecular weight polycarbonate should take place only after the cyclic oligomers have flowed to the desired extent.

The washing of the cyclic oligomeric mixture with a dilute solution of an acid appears to eliminate some of the impurities which cause instability in the mixture. However, even after multiple washes, residual impurities remain which continue to cause slow polymerization with an accompanying increase in viscosity, especially at temperatures of about 300° C. Accordingly, it would be advantageous to provide a stabilizing process or system that would prevent the undesired ring opening of cyclic oligomeric mixtures without interfering with the final polymerization of the cyclic oligomers.

SUMMARY OF THE INVENTION

A principal object of the present invention is to provide a method for preventing premature ring opening and polymerization of a cyclic carbonate oligomer.

Another object of the present invention is to provide a method for improving the melt stability of a cyclic carbonate oligomer so as to substantially prevent premature polymerization of the oligomer. The term "melt stability" refers to the preservation of cyclic structure at or above the flow temperature of the composition in the absence of added polymerization initiators.

It is a further object of the present invention to provide a method for neutralizing impurities responsible for viscosity increase in cyclic oligomers.

It is another object of the present invention to provide a viscosity stabilization method for cyclic oligomers which does not interfere with the function of initiators used in the subsequent polymerization of the oligomers.

Other objects will in part be obvious and will in part appear hereinafter.

These and other objects are achieved by a process which includes adding a stabilizing amount of organic phosphites to cyclic carbonate oligomer compositions to substantially prevent premature polymerization of the oligomers.

An important advantage of this process is that treatment by the organic phosphites does not interfere with the function of initiators which are subsequently added to the mixture of cyclic oligomers when polymerization is desired. Polycarbonates prepared from cyclic oligomer mixtures treated by this method exhibit the same desirable physical properties as polycarbonates treated in any other manner, e.g., properties such as high tensile and impact strength, optical clarity and good chemical resistance.

DETAILED DESCRIPTION OF THE INVENTION

The present invention is directed to a method for imparting melt stability to a cyclic carbonate oligomer, which comprises admixing a composition containing cyclic carbonate oligomers with an amount of an organic phosphite sufficient to substantially prevent premature polymerization of the oligomers.

It has been found that this process is effective to the extent that less than about 5% polymerization occurs in a cyclic carbonate oligomer mixture when the mixture has been held at 250° C. for 60 minutes; and less than about 40% polymerization occurs when the mixture has been held at 300° C. for 30 minutes. The degree of polymerization is measured by gel permeation chromatography (GPC), as described in the examples set forth below. The measure of percent polymer formed excludes any high molecular weight polymer by-product of the reaction used to prepare the cyclic oligomeric mixture.

For the sake of brevity, compositions or admixtures comprising the cyclic carbonate oligomers may hereinafter sometimes be referred to as "cyclic oligomers" or "cyclics mixture".

The term "cyclic carbonate" as used herein includes all molecular groups containing at least one type of cyclic carbonate oligomer, e.g., dimer, trimer, tetramer, etc. Illustrative compositions, as well as methods for their preparation, are described in detail in U.S. Pat. No. 4,644,053, incorporated herein by reference. The structural units in these oligomers generally have the formula:

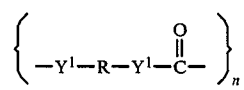

wherein n ranges from about 2 to 30, wherein each R is a divalent aliphatic, alicyclic or aromatic radical, and each $Y^1$ is oxygen or sulfur.

The cyclic oligomer mixtures may contain organic carbonate, thiolcarbonate, and dithiolcarbonate units. Suitable R groups include ethylene, propylene, and many other groups described in the above-referenced U.S. Pat. No. 4,644,053.

Generally, at least about 60% and most often at least about 80% of the R groups in the oligomer mixtures are aromatic groups. Most of these groups can be represented by the formula:

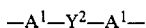

wherein each of $A^1$ and $A^2$ is a single-ring divalent aromatic group and $Y^2$ is a bridging group in which one or two atoms separate $A^1$ and $A^2$. Such R groups frequently are derived from bisphenols of the formula HO—$A^1$—$Y^2$—$A^2$—OH. $A^1$ and $A^2$ generally represent unsubstituted phenylene and substituted derivatives thereof. The bridging radical $Y^2$ is most often a hydrocarbon group and, particularly, a saturated group such as methylene, cyclohexylmethylene, and isopropylidene. The R group most often present in these oligomeric mixtures is the 2,2-bis (4-phenylene) propyl radical.

Other cyclic carbonates suitable for stabilization by this method include the cyclic heterocarbonate oligomer compositions described in U.S. Pat. No. 4,696,998, incorporated herein by reference. These oligomers are characterized by the presence of non-carbonate groups in the main chain. Illustrative non-groups include amide, ester, ether imide, ether ketone, and ether sulfone.

As mentioned briefly above, the oligomers in the mixtures to be stabilized generally have a degree of polymerization of from about 2 to 30. Furthermore, the compositions have relatively low melting points and are generally liquid at temperatures above 225° C.

Methods for the preparation of cyclic carbonate oligomer mixtures are known in the art and are described in detail, for example, in U.S. Pat. Nos. 4,644,053 and 4,696,998, both referenced above. For example, the cyclic oligomers may be formed by reacting a bishaloformate such as bisphenol A bischloroformate with triethylamine and aqueous sodium hydroxide. Typically, such a reaction is carried out in a nonpolar solvent such as methylene chloride and chloroform. When the reaction is complete, the solution of the crude product is generally separated and washed one or more times with dilute portions of an acid, e.g., less than 1.0M hydrochloric acid.

The conversion of low molecular weight cyclic aromatic carbonate oligomers to linear polycarbonates is known. Reference is made, for example, to U.S. Pat. Nos. 3,155,683, 3,274,214, 3,386,954, 3,422,119, and 4,727,134. U.S. Pat. No. 4,644,053 to Brunelle et al discloses cyclic oligomer compositions which are especially suitable for conversion to high molecular weight linear polycarbonates because of their very low inherent viscosity. For example, these mixtures of cyclic oligomers can be, with the aid of a suitable initiator, simultaneously polymerized with an initiator and molded to produce polycarbonate articles having the highly desirable physical properties possessed by polycarbonates prepared by conventional methods. It will be understood that the polymerization takes place in the mold.

The polymerization of cyclic carbonate oligomers to high molecular weight polycarbonate is carried out in the presence of a polymerization initiator. Suitable initiators are disclosed in U.S. Pat. No. 4,727,134, which is incorporated by reference herein. Useful initiators include various bases and Lewis acids, for example, lithium 2,2,2-trifluoroethoxide, n-butyl-lithium, tetramethylammonium hydroxide, lithium tetraphenylborate, sodium tetraphenylborate, sodium bis (2,2'-biphenylene) borate, potassium tetraphenylborate, tetramethylammonium tetraphenylborate, tetra-n-butylammonium tetraphenyl-borate and tetraphenylphosphonium tetraphenylborate.

The reaction used to form the cyclic carbonate oligomers produces by-products which are thought to be initiators of the premature polymerization of the oligomers. These by-products are believed to be anionic and comprised of phenoxide-terminated, linear carbonate oligomers. Treatment of the cyclics mixture with an effective amount of the organic phosphite has been found to neutralize the effect of these by-products, thereby resulting in the melt stability of the cyclic oligomers.

Organic phosphites which increase the melt stability of the cyclic carbonate oligomer without interfering with subsequent intended polymerization may be used in the process of the present invention. Organic phosphites which may be used in the practice of the present invention include triaryl, trialkyl or mixed aryl-alkyl phosphites, having the formula

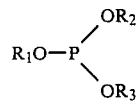

wherein $R^1$, $R^2$ and $R^3$ are independently selected from hydrogen, alkyl, aryl, cycloalkyl, aralkyl and alkylaryl radicals wherein at least one R is other than hydrogen. Preferably, these radicals have 1 to about 20 carbon atoms. Alkyl may be methyl, ethyl, propyl, isopropyl, butyl isomers, e.g., butyl, sec-butyl, tert-butyl, amyl isomers, hexyl isomers, nonyl isomers, and eicosyl isomers, and the like. Cycloalkyl may be cyclobutyl, cyclohexyl, 2-methylcyclohexyl, 4-methylcyclohexyl, 2-ethylcyclohexyl, 4-ethylcyclohexyl, 4-isopropylcyclohexyl, and the like. Aryl may be phenyl, 1-naphthyl, 2-naphthyl, biphenylyl, terphenylyl, and the like. Aralkyl may be any of the above alkyl groups substituted with one or more of the above aryl groups, e.g., benzyl, phenylethyl, 1-phenylpropyl, and the like. Alkaryl may be any of the above aryls substituted with one or more of the above alkyls, e.g., o-tolyl, xylyl, cumyl, mesityl, butylphenyl, nonylphenyl, and the like.

Typical of some of the preferred phosphites that can be used in this invention are triphenyl phosphite, diphenyl dodecylphosphite, diphenyl phosphite, tris (2,4-di-t-butylphenyl) phosphite di-(t-butylphenyl) octylphosphite, triethylphosphite, tris(nonylphenyl) phosphite dipropylphenyl phosphite, and the like. Triphenyl phosphite and tris (2,4-di-t-butylphenyl) phosphites are particularly useful in the practice of this invention.

Other organic phosphites which may be used in the method of this invention are cyclic diphosphite compounds having the following general formula:

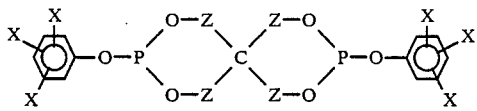

wherein each X is independently selected from the group consisting of a lower alkyl of 1 to about 6 carbon atoms, aryl, alkaryl and aralkyl of 6 to about 20 carbon atoms, hydrogen, and halogen. Each Z is independently an aliphatic group having 1 to about 20 carbon atoms. The most preferred cyclic diphosphite compound for use in the present invention is bis(2,4 di-t-butylphenyl) pentaerythritol diphosphite.

The amount of phosphite stabilizer used in the method of this invention is an amount which is sufficient to substantially prevent the premature polymerization of the oligomer. It will be appreciated that those in the art will be able to determine the minimal amounts necessary. Generally, a phosphite concentration of about 0.01 to 0.25 mole % and, particularly, about 0.05 to 0.10 mole % per total moles of cyclic oligomers, results in melt stability of the cyclic oligomers.

Solution mixing and dry mixing are suitable methods for combining the cyclic carbonate oligomers and the organic phosphites. In the solution mixing method, the organic phosphite is added to an organic solvent solution of the cyclic carbonate oligomers. Solution mixing of the cyclics mixture with the organic phosphite may be carried out while the cyclic oligomers are dissolved in the reaction solvent used for their preparation. It is thought that most of the impurities have been introduced into the solution during the formation of the cyclic oligomers. However, the method of this invention may also be used to treat cyclic oligomer mixtures which have already been separated from the reaction solvents and then re-dissolved in more solvent. Suitable solvents are substantially non-polar organic liquids including aromatic hydrocarbons such as toluene and xylene; substituted aromatic hydrocarbons such as chlorobenzene, o-dichlorobenzene and nitrobenzene; chlorinated aliphatic hydrocarbons such as chloroform and methylene chloride; and mixtures of the foregoing with ethers such as tetrahydrofuran. The preferred solvent is methylene chloride.

In the preferred embodiments, the cyclic oligomer mixture is agitated both during and after addition of the organic phosphite. In order to insure effective treatment, agitation of the cyclic oligomer mixture might be continued for about 3 to about 30 minutes and preferably about 5 to about 10 minutes after addition of the organic phosphite is complete. This additional agitation period appears to result in the substantially complete neutralization of impurities which would otherwise initiate premature polymerization of the cyclic oligomers. The rate of addition of the organic phosphite is not especially critical to the present invention.

The cyclic oligomers may be separated from the organic liquid by any convenient method, such as steam stripping, in which the organic liquid is driven from the cyclic oligomers by high-pressure steam. Alternatively, the cyclic oligomers may be precipitated into a non-solvent such as methanol, isopropanol, or hexane. Furthermore, a procedure often referred to as "steam crumbing" may be employed, in which the solution of cyclics is sprayed into boiling water which is under agitation. The organic liquid boils off, and the cyclics, which are insoluble in water, precipitate. The cyclics product may then be dried by well-known methods, e.g., use of a vacuum oven.

The cyclic oligomer mixture and the organic phosphites may also be combined by dry mixing wherein the oligomers and the phosphite are dry-mixed in a blender to form a composition having increased melt stability.

The invention is illustrated without limitation in the following examples.

In these examples, melt stability of the cyclic carbonate oligomer samples was measured by gel permeation chromatography (GPC) determination of the amount of polymer formed after 1 gram of a sample was heated in an acid-washed, water-rinsed, dry Petri dish at 250° C. for 1 hour or at 300° C. for 0.5 hour, cooled and dissolved in chloroform.

EXAMPLES 1-3 AND COMPARATIVE EXAMPLES A AND B

The melt stability of five samples of cyclic carbonate oligomer mixtures was measured and compared. Three of the samples were treated with an organic phosphite in accordance with the present invention, one sample was treated with triphenyl phosphate (comparative) and the other was left untreated (comparative).

EXAMPLE 1

A sample of cyclic carbonates (10.0 grams, 0.039 moles) was dissolved in 100 milliliters methylene chloride along with 0.05 mole % triphenyl phosphite ($1.97 \times 10^{-5}$ mol) and stirred. The solvent was evaporated and the remaining residue was dried in a vacuum oven.

EXAMPLE 2

Example 1 was repeated using tris (2,4 di-t-butylphenyl) phosphite instead of triphenyl phosphite as the stabilizing agent.

EXAMPLE 3

A sample of cyclic carbonates (10.0 grams, 0.039 moles) and bis (2,4 di-t-butylphenyl) pentaerythritol diphosphite were dry-mixed in a blender.

COMPARATIVE EXAMPLE A

Examples 1 and 2 above were repeated using triphenyl phosphate instead of an organic phosphite as the stabilizing agent.

COMPARATIVE EXAMPLE B

A sample of cyclic carbonates (10.0 grams, 0.039 moles) was left untreated by any stabilizing agent. The GPC test results showing the amount (%) of polymer formed at 300° C. after 0.5 hour for each of the foregoing examples are set forth in Table 1.

TABLE 1

| GPC RESULTS: EXAMPLES 1-3 AND COMPARATIVE EXAMPLES A AND B | | |
|---|---|---|
| Example # | Stabilizing Agent | % Polymer Formed at 300° C. after 0.5 hour |
| 1 | triphenyl phosphite | 5 |
| 2 | tris (2,4 di-t-butyl phenyl) phosphite | 30 |
| 3 | bis (2,4 di-t-butyl phenyl) pentaerythritol diphosphite | 10 |
| A | triphenyl phosphate | 60 |
| B | None | 80 |

As can be seen from the data in Table 1, the addition of organic phosphite stabilizing agents yielded cyclic carbonate oligomer mixtures having improved melt stability as exemplified by the formation of less polymer at 300° C. after 0.5 hour.

EXAMPLES 4–7 AND COMPARATIVE EXAMPLE C

In Examples 4–7, Example 1 above was repeated using additional increments of triphenyl phosphite on a particularly unstable batch of cyclic carbonates. In Comparative Example C, the cyclic carbonates were left untreated. The results are shown in Table 2.

TABLE 2

GPC RESULTS: EXAMPLES 4–7 AND COMPARATIVE EXAMPLE C

| Example # | Mole % of Triphenyl Phosphite | % Polymer Formed at 300° C. for 0.5 hour |
|---|---|---|
| 4 | 0.05 | 40 |
| 5 | 0.10 | 25 |
| 6 | 0.15 | 3 |
| 7 | 0.20 | 0 |
| C | 0.0 | 100 |

The data in Table 2 clearly show the stabilizing effect of the organic phosphite on the cyclic carbonate oligomers, as evidenced by the formation of less polymer at 300° C. after 0.5 hour.

EXAMPLE 8

In a rheological study, a sample of cyclic carbonates stabilized with bis (2,4 di-t-butylphenyl) pentaerythritol diphosphite was extremely stable at 300° C. for 1 hour, increasing in complex viscosity by only 27%, with the final viscosity being roughly $10^3$ poise.

EXAMPLE 9

A polymerization reaction of a cyclic oligomer sample in the presence of 0.05 mole % triphenyl phosphite was carried out in the melt at 250° C. for 15 minutes, using 0.05 mole % tetrabutylammonium tetraphenylborate as initiator. The yield of polymer was quantitative. However, when the polymerization was carried out on the cyclic oligomer sample containing triphenyl phosphite after aging at 300° C. for 0.5 hour, at least 0.1 mole % of initiator was necessary to obtain 100% polymer.

These results may suggest that although phosphites do not interfere with the anionic ring opening of the cyclic carbonates, they form, at elevated temperatures, acidic species which may have an effect on the subsequent polymerization.

The foregoing examples clearly demonstrate that treatment of a cyclic carbonate oligomer with an organic phosphite according to the present invention substantially increases the melt stability of the cyclic carbonate oligomer so as to substantially prevent premature polymerization of the oligomer without interfering with its final polymerization.

While the present invention has been described with reference to particular embodiments thereof, it will be understood that numerous modifications may be made by those skilled in the art without actually departing from the spirit and scope of the invention as defined in the appended claims.

What is claimed is:

1. A method for increasing the melt stability of a cyclic carbonate oligomer, comprising admixing a composition containing cyclic carbonate oligomers with an amount of an organic phosphite sufficient to substantially prevent premature polymerization of the oligomers.

2. A method according to claim 1 wherein the cyclic carbonate oligomers are represented by the formula:

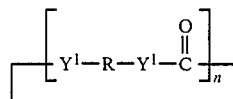

wherein n ranges from about 2 to 30; at least about 60% of the total number of R groups are aromatic organic radicals and the balance thereof are aliphatic, alicyclic, or aromatic organic radicals; and each $Y^1$ is oxygen or sulfur.

3. A method according to claim 2, wherein each R group is represented by the formula:

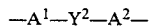

wherein each of $A^1$ and $A^2$ is a monocyclic divalent aromatic radical and $Y^2$ is a bridging radical in which one or two carbon atoms separate $A^1$ and $A^2$.

4. A method according to claim 3, wherein R is a 2,2-bis (4-phenylene) propyl group.

5. A method according to claim 1, wherein the organic phosphite is a triaryl, trialkyl, or mixed aryl-alkyl phosphite, having the formula:

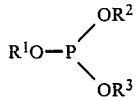

wherein $R^1$, $R^2$ and $R^3$ are independently selected from the group consisting of hydrogen, alkyl, aryl, cycloalkyl, aralkyl and alkylaryl radicals and at least one R is other than hydrogen.

6. A method according to claim 5, wherein the phosphite is triphenyl phosphite.

7. A method in according to claim 5, wherein the phosphite is tris (2, 4 di-t-butylphenyl) phosphite.

8. A method according to claim 1, wherein the organic phosphite is a cyclic diphosphite, having the formula:

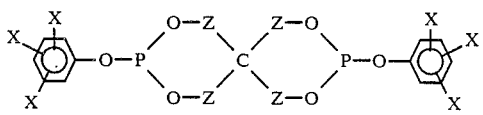

wherein each X is independently selected from the group consisting of a lower alkyl of 1 to about 6 carbon atoms, aryl, alkaryl and aralkyl of 6 to about 20 carbon atoms, hydrogen, and halogen; and each Z is independently an aliphatic group having 1 to about 20 carbon atoms.

9. A method according to claim 8, wherein the phosphite is bis (2,4 di-t-butylphenyl) pentaerythritol diphosphite.

10. A method according to claim 1, wherein about 0.01 to about 0.25 mole % of organic phosphite per total moles of cyclic oligomers is added to the cyclic oligomer composition.

11. A method according to claim 10, wherein about 0.05 to about 0.10 mole % of organic phosphite per total moles of cyclic oligomers is added to the cyclic oligomer composition.

12. A method according to claim 1, wherein the organic phosphite is added to an organic solvent solution of the cyclic carbonate oligomers.

13. A method according to claim 12, wherein the solvent of the solution is a chlorinated aliphatic hydrocarbon.

14. A method according to claim 13 wherein the solvent is methylene chloride or chloroform.

15. A method according to claim 12 wherein the addition of the organic phosphite is accompanied and followed by continued agitation of the mixture for about 3 to about 30 minutes.

16. A method according to claim 15 wherein the agitation is continued for about 5 to about 10 minutes.

17. A method according to claim 1 wherein the organic phosphite and the cyclic carbonate oligomers are combined by dry mixing.

18. A method according to claim 1 further comprising adding an initiator to the cyclic carbonate oligomer composition to initiate polymerization of the cyclic carbonate oligomers.

* * * * *